United States Patent [19]

Christgau et al.

[11] 4,153,854

[45] May 8, 1979

[54] RADIOLUSCENT WINDOW STRUCTURES

[75] Inventors: Hermann Christgau, Fuerth; Ulrich Bodes, Erlangen, both of Fed. Rep. of Germany

[73] Assignee: Siemens Aktiengesellschaft, Berlin & Munich, Fed. Rep. of Germany

[21] Appl. No.: 774,662

[22] Filed: Mar. 4, 1977

[30] Foreign Application Priority Data

Apr. 30, 1976 [DE] Fed. Rep. of Germany ....... 2619293

[51] Int. Cl.2 ........................ H01J 39/02; B23K 31/02

[52] U.S. Cl. .................................... 313/101; 228/208; 228/263

[58] Field of Search ................. 313/101, 388, 59, 420; 220/263

[56] References Cited

U.S. PATENT DOCUMENTS

| | | | |
|---|---|---|---|
| 2,539,247 | 1/1951 | Hensel | 228/208 X |
| 2,674,790 | 4/1954 | Edson et al. | 29/368 |
| 3,180,022 | 4/1965 | Briggs et al. | 228/197 X |
| 3,872,577 | 3/1975 | Kugler et al. | 228/208 |
| 4,045,699 | 8/1977 | Gunther | 313/59 |

OTHER PUBLICATIONS

Fenton, "Brazing Manual," American Welding Society, Inc.; New York, N. Y., 1963; p. 139.

*Primary Examiner*—Robert Segal

*Attorney, Agent, or Firm*—Hill, Gross, Simpson, Van Santen, Steadman, Chiara & Simpson

[57] ABSTRACT

A radioluscent window structure comprised of an aluminum pane gas-impermeably sealed to a metal frame, as on a vacuum tube, is produced by applying a silver layer on the outer frame edges and on the outer pane edges, positioning the resultant metal frame and pane so that the silver layers thereof are in contact with one another and subjecting the resulting structure to diffusion welding conditions sufficient to achieve a gas-impermeable seal between the frame and the pane.

8 Claims, 4 Drawing Figures

RADIOLUSCENT WINDOW STRUCTURES

CROSS-REFERENCE TO RELATED APPLICATION

Attention is directed to S. Gunther U.S. Pat. No. 4,045,699 of Aug. 30, 1977 which is assigned to the instant assignee and which is incorporated herein by reference and which discloses and claims certain radioluscent window structures.

BACKGROUND OF THE INVENTION

1. Field of the Invention

The invention relates to radioluscent window structures and to methods of producing such structures.

2. Prior Art

Known radioluscent window structures, for example, as disclosed in the above referenced application, have a pane manufactured from a two-layered sheet comprised of aluminum and copper whereby the copper layer is removed from the radioluscent portion of the pane and the aluminum layer is removed from the peripheral edges of the pane. In this manner, the resulting pane has a border area composed of a heavy-weight metal (i.e., a metal not overly permeable to radiation and having a density of at least 4.5 grams per cubic centimeter) which extends beyond the actual radioluscent pane. The so-attained heavy-weight metal border area may then be welded to a metal frame, for example, forming a portion of an X-ray image intensifier device. A disadvantage of this radioluscent window structure is that the two-layered sheet, which is a commercially available item, does not always possess a uniform quality, particularly does not possess a uniform gas-impermeable adherence between the two layers forming the sheet. Further, it is necessary to remove material from select areas of such a two-layered sheet before welding and/or other fabrication can occur.

SUMMARY OF THE INVENTION

The invention provides a radioluscent window structure and a method of producing the same.

In accordance with the principles of the invention, a radioluscent window structure is comprised of an aluminum pane sealed in a gas-impermeable manner to a metal frame via a silver layer positioned between the metal frame and the pane.

In accordance with the principles of the invention, improved radioluscent window structures are provided by applying, as by controlled electrodeposition or vapor deposition, a layer of silver onto the outer edge portions of a frame and the outer border area of an aluminum pane, positioning the resulting pane and frame so that the respective silver layers are in contact with one another and subjecting the resulting assembly to controlled pressure-temperature-time conditions to bond the silver layers to one another via diffusion welding. Exemplary conditions for achieving diffusion welding include a pressure in the range of about 60 to 180 Newtons per square millimeter, a temperature in the range of about 200° to 500° C. and a time period in the range of about 1 to 4 hours.

DESCRIPTION OF THE PREFERRED EMBODIMENTS

Figure 1:
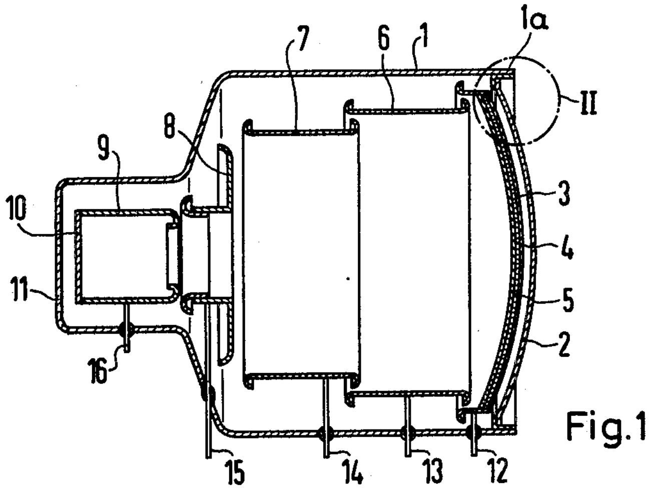
FIG. 1 is an elevated generally schematic view of an X-ray image intensifier device which includes a radioluscent window structure constructed in accordance with the principles of the invention.

The invention provides radioluscent window structures and a method of producing such structures.

Radioluscent window structures produced in accordance with the principles of the invention are readily mounted on metal frames, such as of a vacuum tube or the like and exhibit reproducible gas-impermeable or vacuum-tight seals which are obtainable in an economical manner.

Generally, a radioluscent structure produced in accordance with the principles of the invention comprises an aluminum pane bonded to a metal frame via a layer of silver between contacting portions of the frame and the pane.

In certain embodiments of the invention, the metal frame may comprise a flange surface on a vacuum tube, for example, in an X-ray image intensifier device, and such flange surface may be composed of, for example, steel. In certain embodiments of the invention, the outer edges of the metal frame and the pane areas which are to be coated with silver may first be provided with a nickel layer, on which the silver layer is than applied.

In accordance with the principles of the invention, radioluscent windows are produced by applying a layer of silver onto outer edge portions of a metal frame surface adapted to support the pane and applying a layer of silver onto the pane surfaces which contact the frame. Thereafter, the so-attained pane and frame are positioned so that the respective silver layers thereof are in direct contact with one another and the resultant structure is then subjected to controlled diffusion welding conditions sufficient to achieve a gas-impermeable seal or bond between such silver layers.

Controlled diffusion welding conditions comprise pressure-temperature-time conditions which achieve a vacuum-tight bond between the adjacent silver layers. The pressure may be in the range of about 60 to 180 Newtons per square millimeter, which will hereafter be referred to as $N/mm^2$, and preferably is about 100 $N/mm^2$. The temperature may be in the range of about 200° to 500° C. and preferably is about 260° C. The time period may be in the range of about 1 to 4 hours and preferably is about 1 hour.

In accordance with the principles of the invention, the application of a silver intermediary layer between the metal frame surface and the pane surface to be joined, allows one to achieve, in a reproducible manner, an extremely good connection or bond between the radioluscent window pane and the window frame. This is readily achieved by first coating the pane and the frame on the surface areas thereof which are to be joined with a layer of silver and then pressing the silver layers together at an increased temperature.

An outer border area of a suitably shaped, for example, convexly-shaped or arched, radiation inlet window composed of aluminum or an aluminum alloy and an outer edge portion of a frame for such window, for example, composed of high-grade steel, may first be nickel-plated at least on the surface areas thereof which are to receive the silver layer, in order to improve the applicability of a silver layer on such surface areas. After a suitable thickness of nickel is applied, for example, by electrodeposition, the silver layer is applied onto the resulting nickel layer. Both layers, i.e., the nickel layer and the silver layer, may be applied via controlled electrodeposition or by some other means, for example, via a controlled vapor deposition in a high vacuum environment.

Suitable processes for nickel plating of aluminum are known, for example, as described in German Offenlegungsschrift No. 2,512,339 and generally comprise first cleansing or degreasing the surfaces to be plated, then chemically corroding the cleansed surfaces so that any oxide thereon is removed, and then activating the resultant surface by etching, followed by deposition of iron and then subjecting the surface to a dull electro-nickel plating process.

Silver may be applied, as by electrodeposition or other means, onto the nickel layer in a conventional manner.

In an exemplary embodiment, the respective nickel layers are applied in thicknesses ranging from about 5 $\mu$m (abbreviation for millimicrons) to 25 $\mu$m and preferably about 15 $\mu$m while the silver layers are applied in a thickness ranging from about 5 $\mu$m to 20 $\mu$m and preferably about 15 $\mu$m. It will be appreciated that the thickness of the respective nickel layers is about one-half of the thickness of the ultimate silver layer.

The coupling or bonding of a radioluscent window pane with a frame occurs via the diffusion of the two silver layers into one another under an applied pressure in the range of about 60 N/mm$^2$ to 180 N/mm$^2$ and typically at an applied pressure in the order of magnitude of about 100 N/mm$^2$. Substantially simultaneously with the application of pressure, the temperature of the surfaces or parts to be joined is raised to about 200° to 500° C. and typically to about 260° C. and such pressure-temperature conditions are maintained for a period of time ranging from about 1 to 4 hours and typically for about 1 hour.

The required pressure can be readily produced by placing or clamping the parts to be joined in a suitable press or mold. It is expedient to utilize a type of press or mold comprised of press-rings or shaping-rings which have pressure surfaces that fit against the surfaces of a frame and a window pane that are to be joined and which can be controllably forced against such surfaces via appropriate means, such as bolt-nut combinations or other pressure-applying means. Preferably, the selected press assembly is composed of a material which has a linear coefficient of expansion that is greater than that of the pressure-applying means, i.e., the bolt-nut combinations forcing such rings together.

Prior to the diffusion welding step, the silver layers may be cleansed, for example, abrasively, in order to remove any sulfide layers or the like which may be adhering to the silver. In an exemplary embodiment, silver surfaces are treated with commercially available scouring agents intended for domestic usage or with extremely fine silicon carbide particles (i.e., 600 mesh).

The press or compression assembly used to force the surfaces to be bonded together may be composed of, for example, a high-strength steel. The bolts and nuts forming a part of such press assembly may also be composed of a high-strength material. Depending upon the strength of the material forming the pressure-applying means, (i.e., the bolts and nuts), a suitable number of bolts and nuts may be employed to provide a corresponding pre-stress or initial stressing force on the assembled surfaces. For example, with a radioluscent window having a diameter of about 25 centimeters positioned in a press assembly composed of a steel having a strength class of St 60 (St is an abbreviation for designating the strength of mechanical parts) and bolts and nuts of a strength class of St 12.9, twenty bolt-nut combinations are positioned at regular intervals about the press rings and secured with a torque force of 78 Nm (abbreviation for Newton-meter). A pressure of about 100 N/mm$^2$ is produced by this press assembly in the seal or bond area, i.e., in a 4 mm (abbreviation for millimeter) wide border area of the window structure. The so-pressed together parts are heated in this press assembly or compression means for about 1 hour at about 260° C. During this heating period, the pressure is maintained substantially constant and preferably is not permitted to fall substantially below about 100 N/mm$^2$. Under the foregoing pressure or load on the bonding areas, about 15% of the thickness of the border area of the aluminum window pane is plastically deformed or shaped. Due to this cold flowage of aluminum, morphological imperfections, such as scratches, or the like, in the adjacent surfaces are compensated for and an approximation of such surfaces to roughly an atomic distance is achieved. Under the foregoing conditions, a diffusion of silver is achieved which is sufficient to form a vacuum-tight bond and which uniformly extends over the entire bonding surface.

Variations of the above described compression or press assembly may also be utilized, based on the same fundamental principle, i.e., with the utilization of a press frame having threaded securement or pressure-applying means. The desired surface pressure is provided by virtue of the fact that the press assembly is composed of high-grade steel having a relatively high linear coefficient of expansion and the pressure-applying means or bolts are composed of a material having a relatively low linear coefficient of expansion. The initial amount of pressure applied onto the assembled frame-window assembly must be regulated in such a manner that the pressure takes into account the ratios of expansion of the respective parts occurring during the heating involved in the diffusion welding process so that the surface or contact pressure will be in the order of magnitude of about 100 N/mm$^2$ throughout the process.

Referring now to the drawings wherein like reference numerals designate like elements, FIG. 1 illustrates an exemplary device containing a frame having a radioluscent window mounted therein. For example, the device may comprise a vacuum tube of an X-ray image intensifier and the construction of such a device will be set forth.

A typical X-ray image intensifier comprises a vacuum housing or tube 1 composed of steel and sealed with a radiation inlet window 2. The radiation inlet window 2 is, according to the invention, composed of aluminum or aluminum alloy and has a thickness of about 0.9 to 1.5 mm. The window 2 is mounted in accordance with the principles of the invention on an outer edge of a frame 1*a*, forming a portion of the housing 1. A cathode means is positioned within housing 1 behind window 2 and is comprised of an aluminum cover member 3, a fluorescent layer 4 and a photocathode layer 5. Interiorly of the cathode means, electrodes 6, 7, 8 and 9 are respectively arranged. These electrodes are part of the electro-optical system with which electrons released or emitted from the cathode means are imaged or focused on a fluorescent screen 10 disposed parallelly to a transparent end wall 11 of housing 1. The actual image-formation by the electrons is effected via controlled voltages supplied to the individual electrodes by electrical feed lines 12-16, which are operationally coupled to an appropriate voltage source (not shown).

Figure 2:
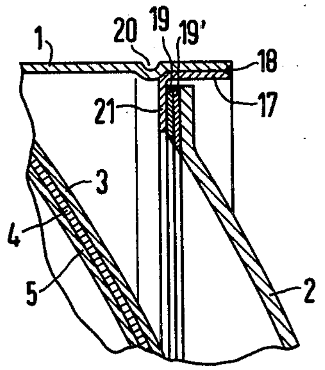
FIG. 2 is an enlarged fragmentary view of an encircled portion II in FIG. 1.

FIG. 2 illustrates an enlargement of the border or edge of the window 2 and the supporting frame. As is shown, silver layers 19 and 19' are provided between the aluminum pane 2 and a frame 17, which in the embodiment illustrated, is constructed as an L-shaped ring secured in a vacuum-tight manner, as by weld seam 18, to an end edge of housing 1. The layers 19 and 19' comprise the actual attachment or bond between pane 2 and frame 17. In order to more readily align the frame 17 with the end edge of the housing 1, a dimple or bead 20 may be provided along the end wall of the housing so that the bent or angled portion of the L-shaped frame 17 abuts thereagainst.

In joining or bonding the frame 17 with window 2, both of which are provided with respective silver layers 19 and 19' on the respective contacting surfaces in the hereinabove indicated manner, the silver surfaces to be joined may be treated with a water-soluble emery paper (having 600 mesh silicon carbide particles). Then the so-cleansed silver surfaces are placed in contact with one another and positioned within a press assembly 22, shown in FIG. 3. The press assembly 22 is comprised of a steel ring 23 having a radially extending outer wall or flange 24 along one side thereof so that a recess is defined therein, within which a second steel ring 24 fits. The rings 23 and 24 are fixedly joined to one another via a plurality of bolts 25 and nuts 26 whereby one portion of frame 17 may be positioned within a suitable size groove 27 in ring 24 and another portion of frame 17 may abut against a planar surface 21 of ring 23 while a border area of pane 2 abuts against a planar edge surface 27*a* of ring 24. As can readily be seen, the so-positioned frame and pane surfaces are forced against one another by controlled tightening of the nuts 26. With a press assembly of the type here illustrated, i.e., one capable of continously applying pressure to force at least select surfaces of a frame and a pane together, the press assembly, together with the clamped frame and pane, may be placed within a suitable furnace means to heat at least the surfaces being pressed together for a period of time, such as 1 hour, at an elevated temperature, such as 260° C.

Figure 3:
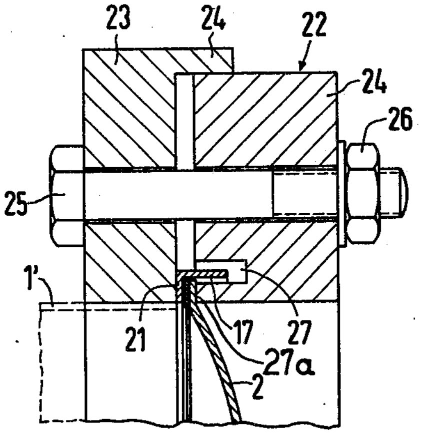
FIG. 3 is a partial generally schematic view of an apparatus useful in producing radioluscent window structures in accordance with the principles of the invention.
Figure 4:
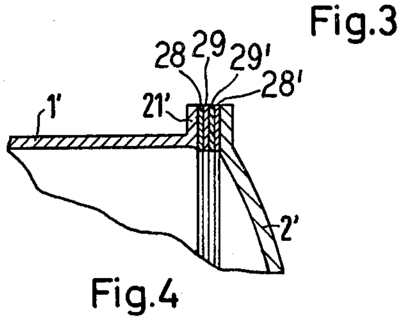
FIG. 4 is a view somewhat similar to that of FIG. 2 but showing another embodiment of a radioluscent window structure constructed in accordance with the principles of the invention.

FIG. 4 illustrates another embodiment of a frame having a radioluscent window mounted therein, which is somewhat simpler than the embodiment described earlier. In this embodiment, a structure 1' may be provided with an upturned end flange surface 21', which thus corresponds to frame 17 of the embodiment described at FIG. 2. Nickel layers 28 and 28' are respectively applied onto the flange surface and pane surface to be joined and silver layers 29 and 29' are then provided on the nickel layers and bonded together as explained hereinabove. With this type of construction, a somewhat more simplified press assembly may be utilized, since, for example, the groove 27 of press assembly 22 in FIG. 3 is not required.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim as our invention:

1. A radiouluscent window structure comprised of an aluminum pane bonded to a metal frame via a substantially gas-impermeable seal comprising a first nickel layer in contact with respective outer edge surfaces of said frame, a second nickel layer in contact with respective outer edge surfaces of said pane, and a silver layer in contact with said first and second nickel layers.

2. A radioluscent window structure as defined in claim 1 wherein said frame comprises a flange surface on a vacuum tube which is sealed with said aluminum window pane.

3. A radioluscent window structure as defined in claim 2 wherein said flange surface is an L-shaped ring member welded onto an end wall of a vacuum tube.

4. A radioluscent window structure as defined in claim 1 wherein each nickel layer has a thickness in the range of about 5 to 25 $\mu$m and the silver layer has a thickness in the range of about 10 to 40 $\mu$m.

5. A radioluscent window structure as defined in claim 4 wherein the thickness of each nickel layer is about one-half the thickness of the silver layer.

6. In an X-ray image intensifier device having a vacuum housing sealed at one end with a radiation inlet window, the improvement comprising wherein:

said radiation window is an aluminum pane bonded to an end wall of the vacuum housing via a substantially gas-impermeable seal comprised a first nickel layer in contact with outer edges of said end wall, a second nickel layer in contact with an outer border area of said pane, and a silver layer in contact with said first and second nickel layers.

7. An X-ray image intensifier device as defined in claim 6 wherein said vacuum housing end wall and at least said outer border area of the pane are in parallel relation to one another.

8. In a radioluscent window structure having an aluminum window pane bonded to a metal frame via an intermediate coating between the frame and the pane, the improvement comprising wherein said intermediate coating is composed of a layer of nickel, a layer of silver and a further layer of nickel, said layers of nickel being, respectively, in contact with said metal frame and said pane.

* * * * *